(12) United States Patent
Sudbrink et al.

(10) Patent No.: US 10,499,554 B2
(45) Date of Patent: Dec. 10, 2019

(54) ANTI WOBBLING CASTOR SUPPORT FOR A WHEEL

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 732 days.

(21) Appl. No.: 15/148,535

(22) Filed: May 6, 2016

(65) Prior Publication Data

US 2017/0318734 A1 Nov. 9, 2017

(51) Int. Cl.

| *A01B 63/16* | (2006.01) |
| *A01B 76/00* | (2006.01) |
| *A01B 59/042* | (2006.01) |
| *B60B 33/00* | (2006.01) |
| *B60B 33/06* | (2006.01) |

(52) U.S. Cl.
CPC ............ *A01B 76/00* (2013.01); *A01B 59/042* (2013.01); *A01B 63/16* (2013.01); *B60B 33/0002* (2013.01); *B60B 33/066* (2013.01)

(58) Field of Classification Search
CPC ............................ B60B 33/0002; A01B 63/16
USPC .......................................................... 172/383
See application file for complete search history.

(56) References Cited

U.S. PATENT DOCUMENTS

| 1,069,340 | A | * | 8/1913 | Lee | ........................ | A01B 15/10 |
| | | | | | | 172/415 |
| 1,896,234 | A | * | 2/1933 | Hathorn | ................... | B64C 25/50 |
| | | | | | | 16/35 D |
| 2,761,692 | A | | 9/1956 | Sisulak | | |
| 3,124,922 | A | * | 3/1964 | Glass | ..................... | A01D 80/00 |
| | | | | | | 16/18 R |
| 3,306,369 | A | * | 2/1967 | Brewer | .................. | A01B 51/04 |
| | | | | | | 172/319 |
| 3,700,041 | A | * | 10/1972 | Ryan | ..................... | A01B 63/22 |
| | | | | | | 172/316 |
| 4,026,365 | A | * | 5/1977 | Andersson et al. | ... | A01B 63/22 |
| | | | | | | 172/386 |
| 4,119,156 | A | * | 10/1978 | Wheeler et al. | ......... | A01B 3/46 |
| | | | | | | 172/386 |

(Continued)

FOREIGN PATENT DOCUMENTS

WO 2014/053426 A1 4/2014

OTHER PUBLICATIONS

"Point Finishing Mower", Erskine Attachments 3-Point Finishing Mower, Feb. 28, 2016 (2 pages).

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A castor wheel support for a towed agricultural implement. The castor support has a spindle for supporting a castor mounting structure for pivoting movement. The castor mounting structure includes an annular friction element received over the spindle and a plurality of C-shaped shims removable laterally without disassembly of the mounting structure to allow the pressure on the friction element to be set to minimize wobbling.

17 Claims, 5 Drawing Sheets

(56) References Cited

U.S. PATENT DOCUMENTS

| | | | |
|---|---|---|---|
| 4,969,232 A | | 11/1990 | Michel |
| 5,167,048 A | | 12/1992 | Geiger et al. |
| 5,214,823 A | | 6/1993 | Screen |
| 5,355,664 A | | 10/1994 | Zenner |
| 5,463,855 A | * | 11/1995 | Johnson et al. ....... A01B 73/00 16/19 |
| 5,562,167 A | | 10/1996 | Honey |
| 5,809,612 A | | 9/1998 | Finch |
| 5,960,250 A | * | 9/1999 | Yasumoto et al. ...... C22C 38/02 252/572 |
| 5,967,535 A | | 10/1999 | King |
| 6,874,943 B2 | * | 4/2005 | Goto et al. ............... C21D 9/40 384/492 |
| 6,944,910 B2 | | 9/2005 | Pauls |
| 7,040,079 B2 | * | 5/2006 | Crosby ................. A01B 19/02 56/384 |
| 8,499,414 B1 | | 8/2013 | Lemeur, Jr. et al. |
| 9,095,094 B2 | | 8/2015 | Ziembicki |
| 2001/0049859 A1 | | 12/2001 | Lewis et al. |
| 2015/0156947 A1 | * | 6/2015 | Sudbrink et al. ...... A01B 63/22 172/421 |

OTHER PUBLICATIONS

Woods HD Mower, items for sale taken from www.wctractor.com, Feb. 28, 2016 (1 page).

\* cited by examiner

ANTI WOBBLING CASTOR SUPPORT FOR A WHEEL

BACKGROUND OF THE INVENTION

1. Field of the Invention

The present invention relates to agricultural implements, and, more specifically, to castor wheel assemblies used in such implements.

2. Description of the Related Art

One of the widely used support systems for allowing ground movement at a precise elevation above the ground utilizes trailing wheels and front castor wheels. Towed tillage implements advantageously use this type of support system to more closely follow the ground contours. The trailing wheels (and the front castor wheels) are usually movable up and down so that the height of the implement frame above the ground may be controlled. Along with the trailing wheels, which have a fixed axis of rotation, there are usually a pair of forward castor wheels, widely used, so that the towed direction of the implement is followed by pivoting of the castor wheels. In addition to the field position, the rear wheels and the front castor wheels may be placed in a transport position in which the ground engaging elements of the tillage implement are elevated above the surface level of the soil.

While the castor wheels allow a simplified way of following the direction of movement set by a tractor pulling the implement, they do experience, under operating conditions, an oscillation that is considered to be wobbling. A number of factors can contribute to the wobble and they include weight balance, internal friction, towing speed and trailing arm geometry.

Because many of these factors are dynamic and not controlled necessarily by the machine operator, it has been proposed to include friction elements in the pivoting support for the castor wheel so as to inhibit wobbling. The friction elements, at first glance, offer a direct solution to the problem. However, the wear incurred by friction elements over time, decreases the inhibiting force and results in less effective damping of the wobble. It has been proposed to use spring loaded brake elements to offer a consistent friction force to inhibit the wobbling over an extended period of time. However, this approach introduces additional cost and complexity. Furthermore, the friction mechanisms maybe prone to accumulation of soil and other debris to diminish their effectiveness.

Accordingly, what is needed in the art is a simplified way to introduce friction in a castor wheel assembly.

SUMMARY OF THE INVENTION

The present invention seeks to provide a simplified way of introducing friction into a castor wheel assembly allowing for flexible adjustment of the friction to reduce wobble.

In one aspect of the present invention, a castor support assembly is provided for a wheel. The support assembly includes a base, a spindle extending downward from the base and a castor mounting structure having a bore received over the spindle to permit pivoting movement about the spindle and an axle for rotatably mounting the wheel. A thrust bearing is provided on the spindle between the base and the castor mounting structure. A removable disk is secured to the end of the spindle and an annular friction element is received over the spindle between the castor mounting structure and the removable disk. A plurality of shims of predetermined thickness are positioned between the end of the spindle and the removable disk for setting the clearance between the friction element and the end of the castor mounting structure to inhibit oscillation of the castor support assembly.

In another aspect of the present invention, an agricultural implement is provided having a frame for towed movement along the ground and a base connected to the frame by an articulated connection. A spindle extends downward from the base and a castor mounting structure having a bore is received over the spindle to permit pivoting movement about the spindle. An axle assembly supporting a wheel extends from the castor mounting structure. A thrust bearing is received on the spindle between the base and the castor mounting structure. A removable disk is secured to the end of the spindle and an annular friction element is received over the spindle between the castor mounting structure and the removable disk. A plurality of shims of predetermined thickness are positioned between the end of the spindle and the removable disks for setting the clearance between the friction element and the end of the castor mounting structure to inhibit oscillation of the castor support assembly.

An advantage of the present invention is a simplified and effective reduction in wobbling of the castor wheel assembly.

Another advantage of the invention is the easy removal and installation of the elements that set the clearance and thus the friction force of a castor wheel assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
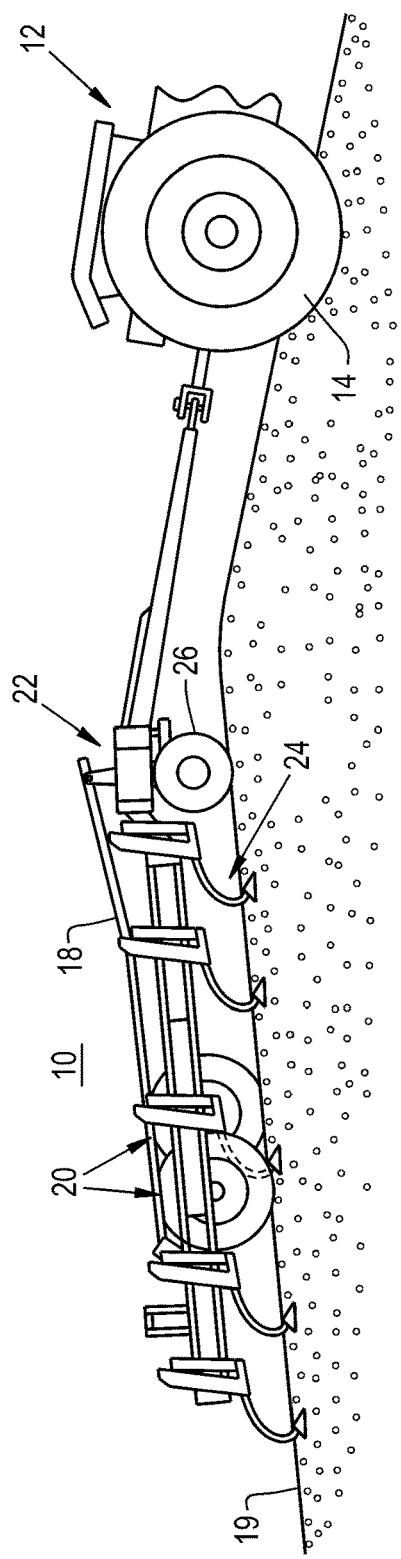
FIG. 1 is a side view of a towed agricultural implement which may incorporate the present invention.

Referring now to the drawings, and more particularly to FIG. 1, there is shown a tillage implement 10 which is towed by a tractor 12 having tractor drive wheels 14 over the soil 19. The tillage implement 10 is connected to the tractor 12 by a tow bar 16 and has a frame 18 supported above the soil 19 by a pair of trailing wheel assemblies 20 and forward castor wheel assemblies 22. The trailing wheel assemblies 20 and forward castor wheel assemblies 22 are configured to support the frame 18 at variable selected heights above the soil 19 according to the operational conditions and transport conditions of the tillage implement 10. Tillage implement 10, as illustrated, supports a plurality of cultivators 24.

However, it should be understood by those skilled in the art that a wide variety of tools may be supported for broadly tilling the soil 19. During field operations, the trailing wheel assemblies 20 and the forward castor wheel assembly 22 support the frame so that the cultivators 24 are at a predetermined depth according to the particular requirements. During transport to the field, the trailing wheel assembly 20 and the forward caster wheel assemblies 22 elevate the frame 18 so that the cultivators 24 are clear of the soil 19. The mechanism for articulating the trailing wheel assemblies 20 and the forward castor wheel assemblies is well known and is not described to enable a clearer focus on the invention.

During field operation and transport between fields, the trailing wheel assemblies 20 track the tow bar 16 and the castor wheel assemblies 22 pivot so that their wheels 26 track and follow the path established by the tractor 12 and the trailing wheel assemblies 20.

Figure 2:
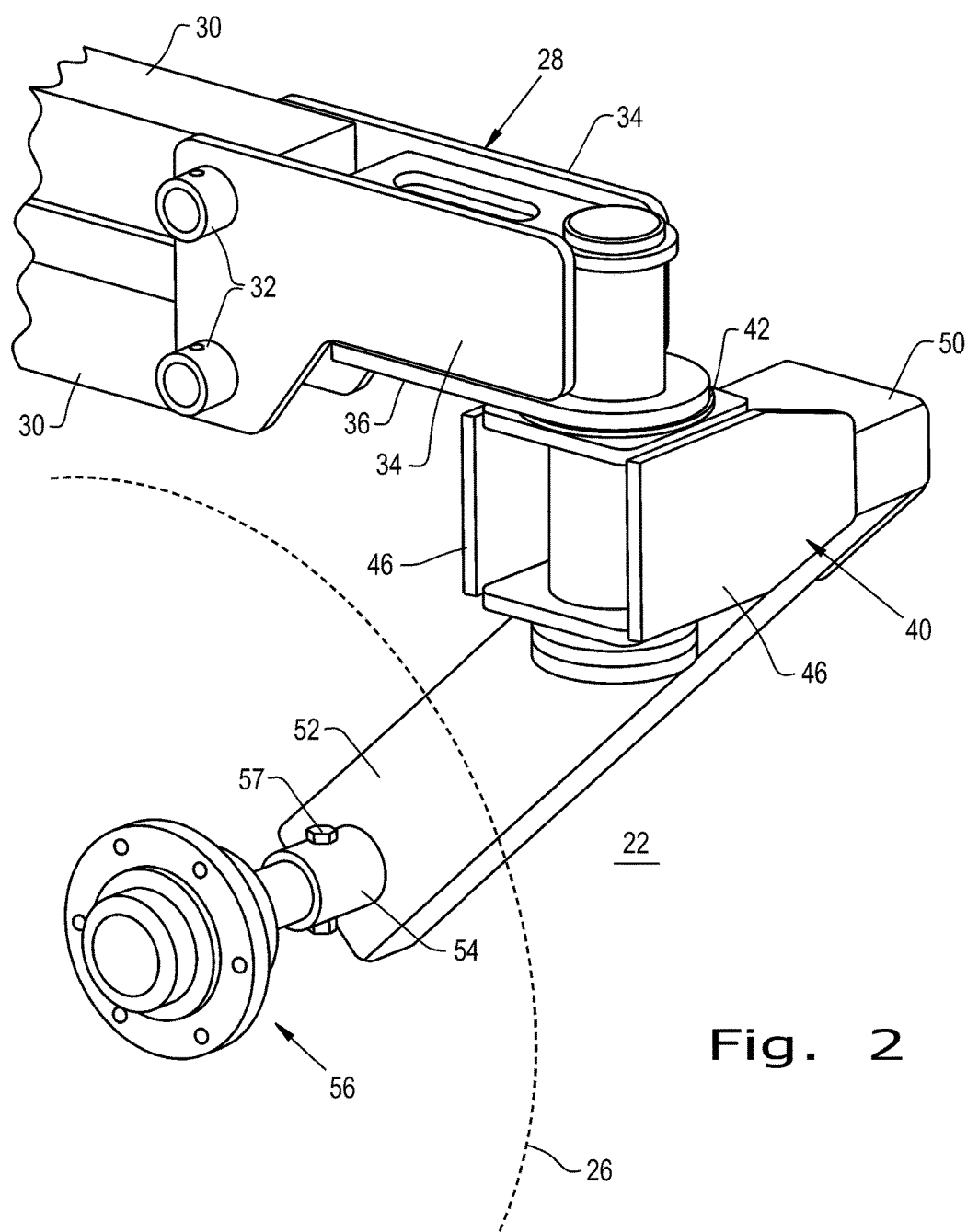
FIG. 2 is a perspective view of a castor support assembly for a wheel embodying the present invention.
Figure 3:
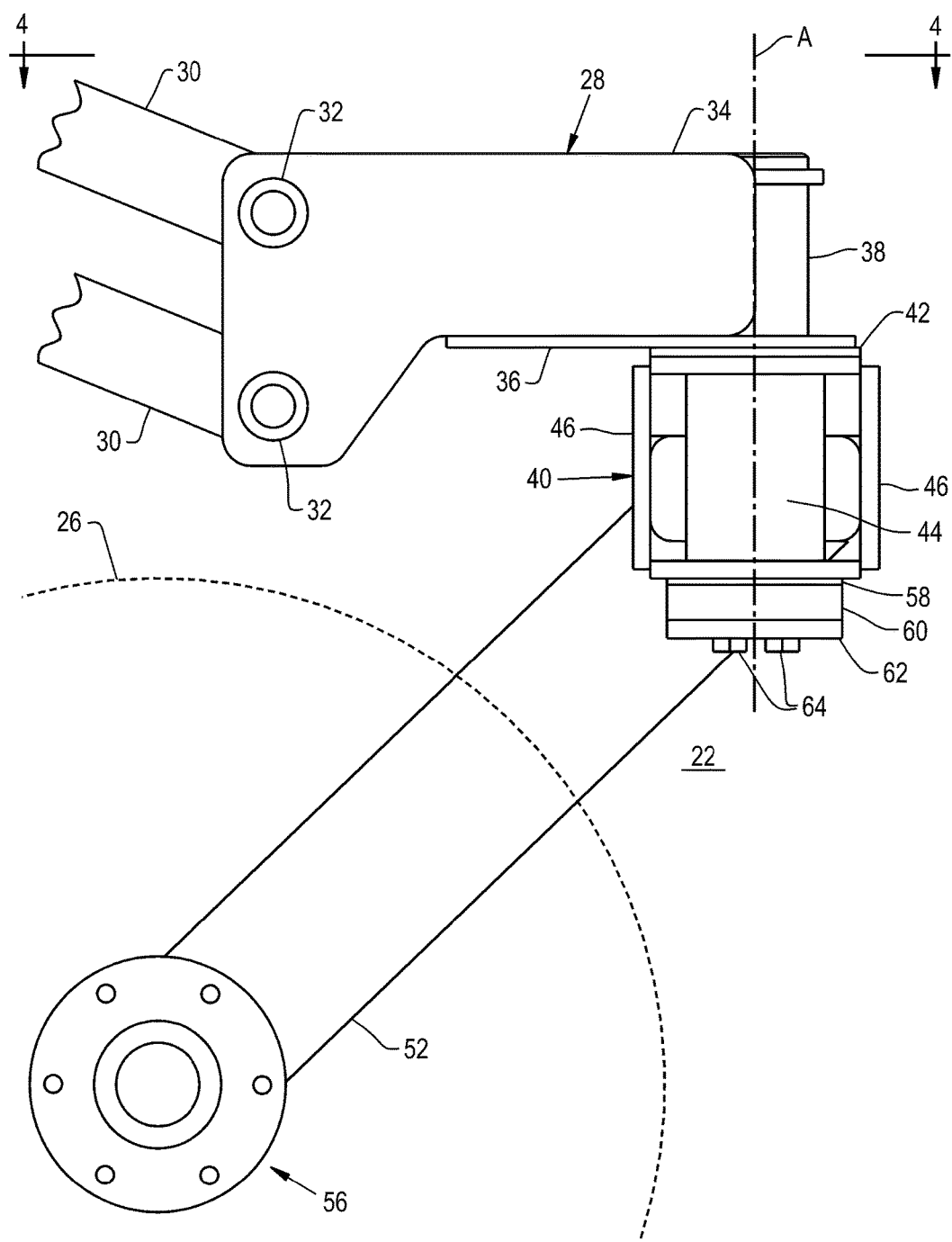
FIG. 3 is a side view of the castor support assembly of FIG. 2.
Figure 4:
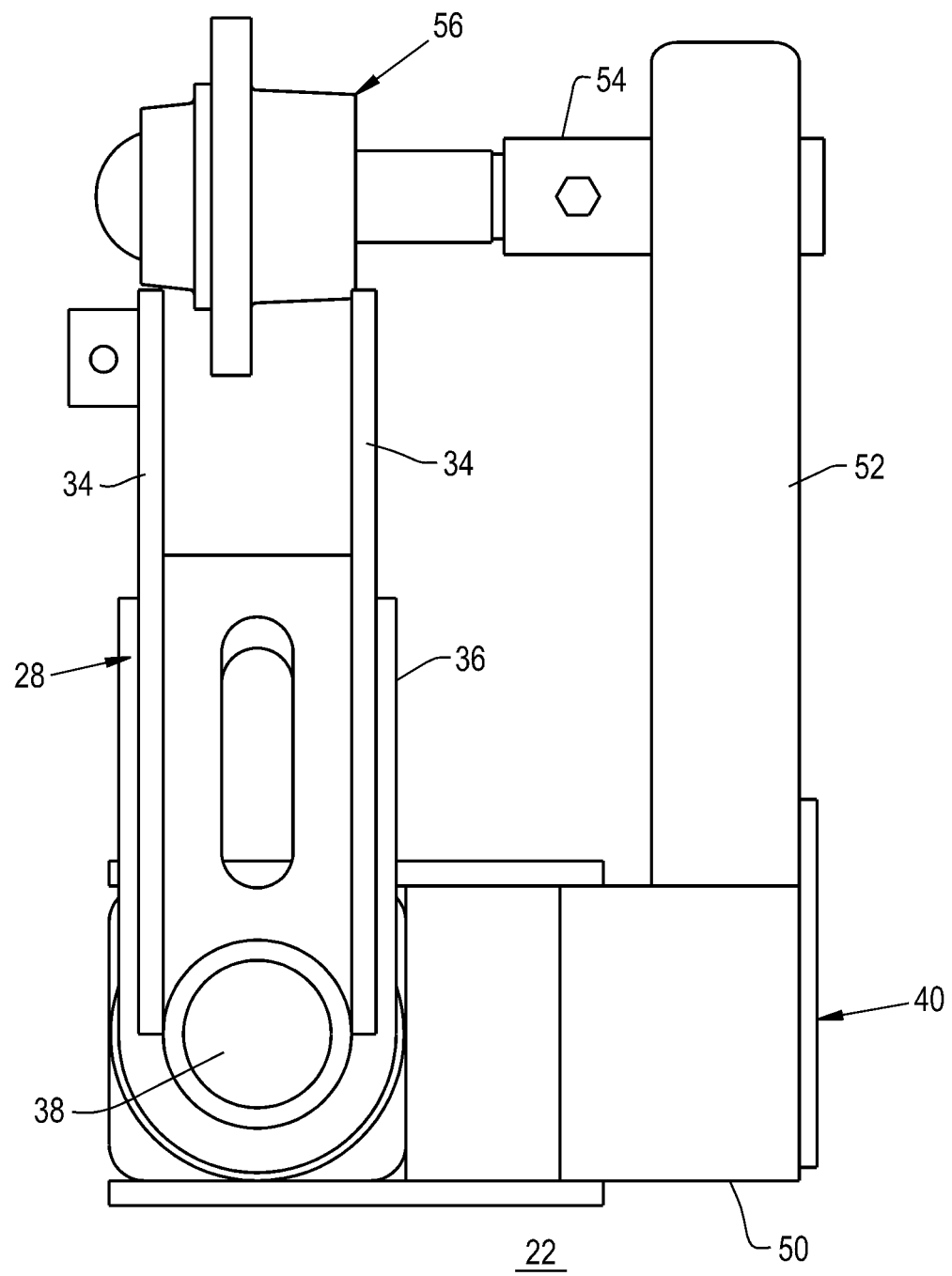
FIG. 4 is a view of the castor support assembly of FIGS. 2 and 3 taken on plane 4-4 of FIG. 3.
Figure 5:
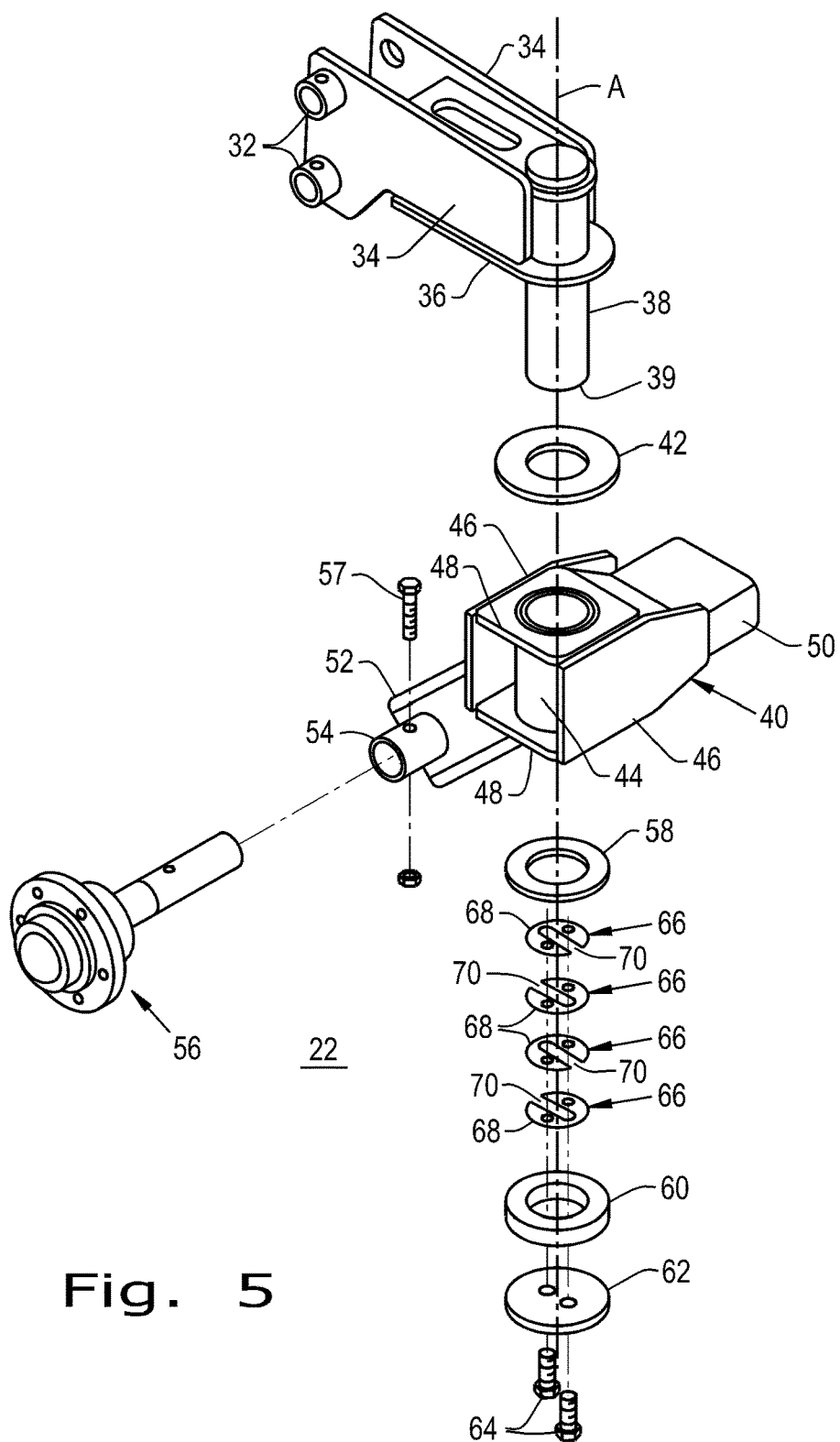
FIG. 5 is an exploded perspective view of the castor support assembly of FIGS. 2-4.

While prior art castor wheel assemblies 22 adequately follow the movement, the fact that the castor wheel assemblies 22 may pivot can cause oscillation or wobbling, both in the field operation condition and in the transport condition. In accordance with the present invention, the castor support assembly illustrated in FIGS. 2-5 minimizes, if not eliminates, such wobbling. Referring first to FIG. 2, the castor support assembly 22 includes a base 28 supported by parallel links 30 appropriately connected and articulated to frame 18. Parallel links 30 connect to base 28 at pivotal connections 32. The effect of the parallel link connection maintains the base 28 at a constant orientation relative to frame 18 and thus the soil 19. The base 28 has a pair of side plates 34 extending from the pivotal connection 32 and is reinforced with a web 36. A downwardly extending spindle 38 having a longitudinal axis A is connected to and supported by side plates 34 and web 36. The spindle 38 may be secured to the structures in many different ways, including welding. A castor mounting structure 40 includes a thrust washer 42 positioned over spindle 38 and a sleeve 44 forming a central through bore that is received over spindle 38. Thrust washer 42 may be formed from nylon or any other appropriate anti-friction material. Sleeve 44 is positioned between side plates 46 and interconnecting top and bottom webs 46 and 48 forming a structural unit. A box-like extension 50 extends laterally to an arm 52 which extends downwardly at an angle where a sleeve 54 extends at a right angle for supporting a removable axle assembly 56. A pin 57, extendable through the sleeve 54 and axle assembly 56, permits removable mounting thereof. The wheel 26 shown by dashed lines in FIGS. 2 and 3, is appropriately mounted on the axle assembly 56. A spacer 58 is positioned over spindle 38 below sleeve 44 and abuts an annular friction element 60, herein shown as being formed from polyurethane or other suitable friction material. An abrasion resistant steel, AR400, is a preferred material for annular friction element 60. A disk 62 is removably fastened to the lower end 39 of spindle 38 by means of a pair of screws 64. A plurality of shims 66 are positioned between the end of spindle 38 and disk 62 and within the inner diameter of annular friction element 60. The shims 66 each have predetermined thicknesses allowing for the mounting of the disk 62 at a variable distance from the end 39 of spindle 38 so as to control the compression of annular friction element 60 against spacer 58 and sleeve 44. The shims 66 each have a circular circumference 68 co-incident with the outer diameter of spindle 38 to fit within the inner diameter of annular friction element 60. The shims 66 also have recesses 70 so that the spacers form generally a C-shape in plan view. This permits removal of the spacers 66 in a lateral direction relative to the axis A of spindle 38. In addition, the screws 64 act as guides for the spacers 66 during removal and installation. As illustrated, the shims 66 are stacked in staggered relation so that the adjacent recesses 70 point in opposite directions.

In operation, an appropriate number of shims 66 are positioned with the screws 64 loosened to provide access. The number of shims are selected to provide the correct compression of the annular friction element 60 to minimize, if not eliminate, wobbling. Over time, the various components making up the castor support assembly 22 wear, thus reducing the compression on the friction element 60 and, in turn, the effect on damping. The plurality of shims 66 allows shims to be conveniently removed to increase the friction to the original level and thus maintain the damping. All this is done without the need to totally disassemble the castor support assembly by loosening the screws 64 and moving the shims laterally. The arrangement described above provides an extremely simplified and effective way of applying friction to a castor support assembly, thus permitting an economical beginning product and simplified field capable maintenance. In addition, because the shims 66 are internal to the structure, the possibility of debris fouling the mechanism is minimized.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A castor support assembly for a wheel, the support assembly comprising:
    a base;
    a spindle extending downward from the base;
    a castor mounting structure having a bore received over the spindle to permit pivoting movement about the spindle, and an axle operably connected to a portion of the castor mounting structure for rotatably mounting a wheel;
    a thrust bearing positioned on the spindle between the base and the caster mounting structure;
    a removable disk secured to an end of the spindle;
    an annular friction element received over the spindle between the castor mounting structure and the removable disk, the annular friction element having an inner circumference larger than an outer diameter of the spindle; and,
    a plurality of shims, each shim of the plurality of shims of predetermined thickness, each shim having an outer circumference configured to fit within the inner circumference of the annular friction element, each shim having an inner circumference configured to fit around the outer diameter of the spindle;
    wherein each shim of the plurality of shims is positioned on the spindle via a slot recess in each shim and each shim of the plurality of shims is positioned within the inner diameter of the annular friction element to control compression of the annular friction element and to inhibit oscillation of the castor support assembly.

2. The castor support assembly as claimed in claim 1, wherein each shim of the plurality of shims is removable laterally at a right angle to an axis of the spindle.

3. The castor support assembly as claimed in claim 2, wherein the removable disk is secured via the plurality of shims with axial fasteners extending from the end of the spindle and each shim of the plurality of shims has apertures for passage of the axial fasteners therethrough.

4. The castor support assembly as claimed in claim 3, wherein each shim of the plurality of shims is c-shaped with a center of each shim forming the slot recess and each shim of the plurality of shims is positioned in an alternating stacked arrangement relative to each other.

5. The castor support assembly as claimed in claim 1, wherein the axial fasteners comprise two axial fasteners.

6. The castor support assembly as claimed in claim 1, wherein the castor mounting structure comprises a sleeve received over the spindle and opposed plates extending laterally from the sleeve and a structural element extending downward, the axle operably secured to the structural element and extending at a right angle thereto for rotatably mounting the wheel.

7. The castor support assembly as claimed in claim 6, wherein the base comprises a pair of plates structurally connected to the spindle and extending to mounting bores for a parallel link mounting assembly.

8. The castor support assembly as claimed in claim 1 wherein the annular friction element is formed from polyurethane.

9. An agricultural implement for towed movement in a forward direction over a field, the implement comprising:
   a frame extending laterally relative to the direction of movement;
   a base;
   an articulated structural interconnection between the base and the frame;
   a spindle extending downward from the base;
   a castor mounting structure having a bore received over the spindle to permit pivoting movement about the spindle, and an axle operably connected to at least a portion of the castor mounting structure for rotatably mounting a wheel;
   the wheel mounted for rotation on the axle;
   a thrust bearing on the spindle between the base and the castor mounting structure;
   a removable disk secured to an end of the spindle;
   an annular friction element received over the spindle between the castor mounting structure and the removable disk; the annular friction element having an inner circumference larger than an outer diameter of the spindle; and,
   a plurality of shims, each shim of the plurality of shims of predetermined thickness, each shim having an outer circumference configured to fit within the inner circumference of the annular friction element, each shim having an inner circumference configured to fit around the outer diameter of the spindle;
   wherein each shim of the plurality of shims is positioned on the spindle via a slot recess in each shim and each shim of the plurality of shims is positioned within the inner diameter of the annular friction element to control compression of the annular friction element and to inhibit oscillation of the castor support assembly.

10. The agricultural implement as claimed in claim 9, wherein each shim of the plurality of shims is removable laterally at a right angle to an axis of the spindle.

11. The agricultural implement as claimed in claim 10, wherein the removable disk is secured via the plurality of shims with axial fasteners extending from the castor mounting structure and each shim of the plurality of shims has apertures for passage of the axial fasteners therethrough.

12. The agricultural implement as claimed in claim 11, wherein each shim of the plurality of shims is C-shaped with a center forming the slot recess and each shim of the plurality of shims is positioned in an alternating stacked arrangement relative to each other.

13. The agricultural implement as claimed in claim 11, wherein the axial fasteners comprise two axial fasteners.

14. The agricultural implement as claimed in claim 9, wherein the castor mounting structure comprises a sleeve received over the spindle and opposed plates extending laterally from the sleeve and a structural element extending downward, the axle operably secured to the structural element and extending at a right angle thereto for rotatably mounting the wheel.

15. The agricultural implement as claimed in claim 14, wherein the base comprises a pair of plates structurally connected to the spindle and extending to mounting bores for providing an articulated structural connection.

16. The agricultural implement as claimed in claim 9, wherein the annular friction element is formed from polyurethane.

17. The agricultural implement as claimed in claim 9, wherein the annular friction element is formed from AR400 steel.

* * * * *